F. H. WINTER.
VOLTAGE REGULATOR FOR ALTERNATING CURRENT GENERATORS.
APPLICATION FILED MAR. 1, 1919.
1,353,691.
Patented Sept. 21, 1920.
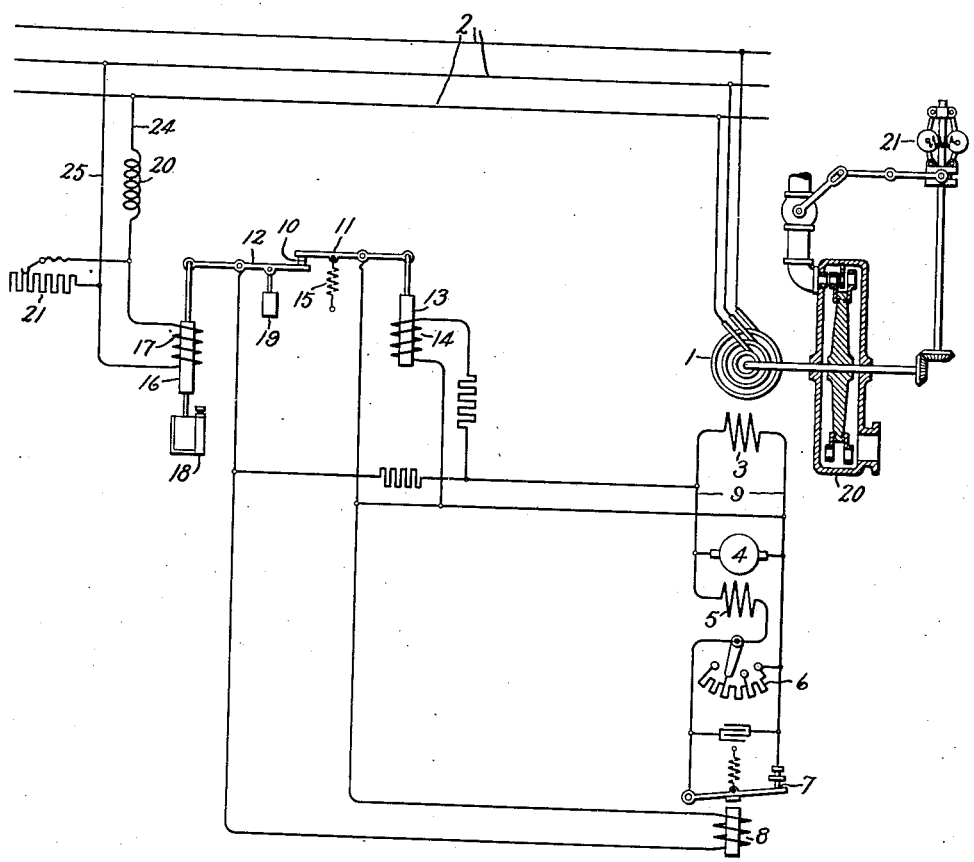
Inventor:
Fred H. Winter,
by Albert G. Davis
His Attorney.

UNITED STATES PATENT OFFICE.

FRED H. WINTER, OF SCHENECTADY, NEW YORK, ASSIGNOR TO GENERAL ELECTRIC COMPANY, A CORPORATION OF NEW YORK.

VOLTAGE-REGULATOR FOR ALTERNATING-CURRENT GENERATORS.

1,353,691.  Specification of Letters Patent.  Patented Sept. 21, 1920.

Application filed March 1, 1919. Serial No. 280,072.

*To all whom it may concern:*

Be it known that I, FRED H. WINTER, a citizen of the United States, residing at Schenectady, in the county of Schenectady, State of New York, have invented certain new and useful Improvements in Voltage-Regulators for Alternating-Current Generators, of which the following is a specification.

My invention relates to alternating current generators which are operated to deliver current at different frequencies.

My invention is especially applicable to alternating current generators which are operated to deliver current at different frequencies to induction motors to produce a change in the speed of the motors and in the electrical power supplied thereto without changing the torque thereof.

The speed of an induction motor may be decreased without substantially changing the torque of the motor by increasing the secondary resistance, but in such a case the electrical power supplied to the motor remains substantially constant. If, however, the voltage and the frequency of the current supplied to the motor are decreased proportionally and the secondary resistance changed, a substantially proportional change in the speed of the motor is produced without substantially changing the torque of the motor, and the power required for running the motor is also decreased. If in such a case, a generator is operated to deliver current at different frequencies to the motor, it is desirable to provide means for automatically changing the voltage of the generator the desired amount when the frequency of the current is changed.

It is the object of my invention to provide means for controlling the voltage of an alternating current generator which is operated to deliver currents at different frequencies, so that the voltage remains constant under varying loads when the frequency of the current remains constant but varies at the same or at a greater or lesser rate than the frequency when the latter is changed.

In accordance with this object, I provide a regulator for maintaining the voltage of the generator constant under varying loads when the frequency of the current remains constant, and means responsive to the frequency of the current supplied by the generator for automatically changing the setting of said regulator in such a manner that it varies the voltage at the same rate as or at a greater or lesser rate than the frequency.

My invention will be more readily understood from a consideration of the following specification taken in connection with the accompanying drawing which is a single figure showing diagrammatically one way in which the voltage of an alternating current generator may be controlled in accordance with my invention.

In the drawing the alternating current generator 1, which is shown as three-phase, supplies current to the supply mains 2. The generator 1, as shown, is driven by a turbine 20, and the arrangement is such that the generator can be driven at several different constant speeds so as to vary the frequency of the voltage generated. This may be accomplished in a number of ways, as for example, by changing the setting of the governor 21 of the turbine, or by changing the gear ratio between the rotating elements of the turbine and the generator. It is to be understood, however, that this invention is not limited to any particular method of varying the speed of the generator, or to any particular way of varying the frequency of the voltage generated. In this specification and drawing my invention is described and shown as applied to a Tirrill regulator which is well known in the art, but it is to be understood that my invention is not limited to any particular type of regulator.

The generator 1 is provided with a field winding 3 which is energized by an exciter 4. The exciter has a shunt field winding 5 in series with which is an adjustable resistance 6. Around this resistance 6 is a shunt circuit consisting of contacts 7 controlled by a relay 8, which receives current from the exciter buses 9. The relay 8 is controlled by a pair of floating contacts 10 carried on levers 11, 12, the former being attached to the movable core 13 of a direct current control relay 14 which is connected across the mains of the exciter. The pull of the relay 14 is opposed by a spring 15. The other lever 12 is attached to a movable core 16 of an alternating current relay 17. A dash pot 18 is connected to the core 16 to retard its movement, and the core is counter-balanced when the proper voltage is being generated by an adjustable weight such as a shot cup 19. The winding of relay 17 is connected across one phase of the supply mains 2 by means of conductors 24 and 25. A potential transformer may be inserted in the circuit, if necessary, to reduce the voltage applied to the winding 17. A suitable reactance coil 20 is inserted in series with the winding 17 so that the impedance of this circuit will vary with a change in the frequency of the voltage of the supply mains 2. A suitable high non-inductive resistance 21 is connected in parallel with the winding 17 so that current flowing through the reactance coil 20 divides and part flows through the resistance 21 and part through the winding 17.

The operation is as follows: Suppose the generator 1 is being run at a certain constant speed so that it generates a voltage of a particular frequency. Under these conditions the resistance 21 and the weight 19 are adjusted to such values that when the voltage of the supply mains 2 is of the proper value the weight 19 and the pull exerted by the winding 17 just counter-balances the weight of the core 16, and the contact carried by the lever 12 is held in the proper position for effecting the control desired. If the voltage of the supply mains tends to change due to a variation in load, the position of the contact carried by the lever 12 is changed to effect a change in the excitation of the generator. For example, if the voltage decreases, the pull exerted by the winding 17 is decreased proportionally, the weight of the core 16 then raises the position of the contact carried by the lever 12 and as a result increases the excitation of the generator 1 in a manner which is well understood in connection with the operation of the ordinary Tirrill voltage regulator. Since it is assumed that the frequency of the voltage does not change, the impedance of the alternating current relay circuit does not change, and, therefore, the current flowing through the relay winding is directly proportional to the voltage of the generator. It will be evident therefore that the voltage is maintained constant for all loads if the frequency remains constant.

Let us now suppose that the speed of the generator is changed so that it runs at some other value, thereby changing the frequency of the voltage generated by the generator. Let us assume the speed is increased thereby causing an increase in the frequency of the voltage generated by the generator. This increase in the frequency of the voltage increases the reactance of the reactance coil 20 so that less current flows through the winding 17. The weight of the core 16, therefore, raises the position of the contact lever 12 and as a result, the excitation of the generator is increased, in the manner well understood in the art, until the voltage of the generator is increased to such a value that the current flowing through the winding 17 causes it to exert a pull which with the weight 19 counter-balances the weight of the core 16. If the frequency is decreased it will be evident that the reactance of coil 20 will decrease and as a result the voltage of the generator will be decreased.

If only a series reactance is used the change in voltage cannot be made directly proportional to the change in frequency because of the resistance of the conductors 24 and 25 and the winding 17. However, I have found that by connecting a high resistance in parallel with the winding 17 and adjusting it to the proper value that the voltage can be automatically changed to a value which is substantially proportional to the change in frequency. Also I have found that if this resistance is decreased below the value which produces a change in voltage which is proportional to the change in frequency, a change in frequency will produce a larger percentage of change in voltage, and if increased above such a value, a change in frequency will produce a smaller percentage of change in voltage. The reason for this result as at present understood is as follows: Since the impedance of the winding 17 consists of inductance and resistance, whereas the shunt circuit around the winding is a non-inductive resistance, a change in the frequency of the voltage produces a proportional change in the inductive reactance of the winding 17 and also in the inductive reactance of the coil 20, but has no effect on the value of the resistance 21. Consequently if the frequency decreases, the inductive reactances of winding 17 and of the coil 20 decrease and a larger portion of the total current flowing through the reactance coil 20 flows through the winding 17 than when the frequency is higher. Therefore, by adjusting the resistance 21 to a proper value, a decrease in frequency will automatically produce a change in the ratio of current flowing through the winding 17 to the total current flowing through conductors 24 and 25 so that the increase of current through the winding 17 (assuming the magnitude of the voltage remains constant) will be either substantially directly proportional to or smaller in percentage than or larger in percentage than the decrease in frequency, depending upon the value of the resistance 21. This increase in current through winding 17 causes a change in the setting of the regulator to decrease in the excitation of the generator to lower the generator voltage to a value such that the current through winding 17 will exert a pull which, with the weight 19, just counter-balances coil 16. This change in voltage will be directly proportional to or at a greater or lesser rate than the change in frequency depending on the value of the resistance 21.

It will also be evident that if the frequency is increased, the setting of the regulator will be changed so that an increase in voltage will be automatically produced which will be directly proportional to or at a greater or lesser rate than the increase in frequency depending on the value of the resistance 21.

It is, of course, apparent that many alterations and modifications may be made in the system herein disclosed without departing from the spirit and scope of my invention, and, therefore, I do not wish to be limited to the specific arrangement shown but aim to cover by the terms of the appended claims all such alterations and modifications.

What I claim as new and desire to secure by Letters Patent of the United States, is:—

1. In combination an alternating current generator, means for operating said generator to deliver currents at different frequencies, a regulator for said generator adapted to maintain the voltage of said generator substantially constant under varying loads when the frequency remains constant, and means responsive to the frequency of the current supplied by said generator for changing the setting of the regulator in such a manner that it will maintain a voltage which varies directly with the frequency of the current delivered.

2. In combination an alternating current generator, means for operating said generator to deliver currents at different frequencies, a regulator for said generator adapted to maintain the voltage of said generator substantially constant under varying loads when the frequency remains constant, and means responsive to the frequency of the current supplied by said generator for changing the setting of the regulator in such a manner that the voltage varies at a rate greater than a change in frequency.

3. In combination an alternating current generator, means for operating said generator to deliver currents at different frequencies, a regulator for maintaining the voltage of said generator substantially constant under varying loads when the frequency remains constant, said regulator having a pair of contacts controlling the excitation of said generator, and a relay responsive to variations in a line condition of said generator for controlling one of said contacts, and means responsive to the frequency of the current supplied by said generator for changing the setting of said regulator in such a manner that the voltage of said generator varies directly with the frequency of the current delivered, said means comprising a reactance connected in series with the winding of said relay, and a non-inductive resistance connected in parallel with said winding.

4. In combination an alternating current generator, means for operating said generator to deliver currents at different frequencies, a regulator for maintaining the voltage of said generator substantially constant under varying loads when the frequency remains constant, said regulator having a pair of contacts controlling the excitation of said generator and a relay responsive to variations in a line condition of said generator for controlling one of said contacts, and means responsive to the frequency of the current supplied by said generator for changing the setting of said regulator in such a manner that the voltage of said generator varies at a rate greater than the frequency of the current delivered when the frequency is changed, said means comprising a reactance connected in series with the winding of said relay, and a non-inductive resistance connected in parallel with said winding.

5. In combination an alternating current generator, means for operating said generator to deliver currents at different frequencies, a regulator for said generator adapted to maintain the voltage of said generator substantially constant under varying loads when the frequency remains constant, and means responsive to the frequency of the current supplied by said generator for changing the setting of the regulator in such a manner that the voltage varies at a rate greater or lesser than a change in frequency.

6. In combination an alternating current generator, means for operating said generator to deliver currents at different frequencies, a regulator for maintaining the voltage of said generator substantially constant under varying loads when the frequency remains constant, said regulator having a pair of contacts controlling the excitation of said generator and a relay responsive to variations in a line condition of said generator for controlling one of said contacts, and means responsive to the frequency of the current supplied by said generator for changing the setting of said regulator in such a manner that the voltage of said generator varies at a rate greater or lesser than the frequency of the current delivered when the frequency is changed, said means comprising a reactance connected in series with the winding of said relay, and an adjustable non-inductive resistance connected in parallel with said winding.

7. In combination an alternating current generator, means for operating said generator to deliver currents at different frequencies, a regulator for maintaining the voltage of said generator substantially constant under varying loads when the frequency remains constant, said regulator having a pair of contacts controlling the excitation of said generator, and a relay responsive to variations in a line condition of said generator for controlling one of said contacts, and means responsive to the frequency of the current supplied by said generator for changing the setting of said regulator, said means comprising a reactance connected in series with the winding of said relay, and a non-inductive resistance connected in parallel with said winding.

In witness whereof, I have hereunto set my hand this 28th day of February, 1919.

FRED H. WINTER.